United States Patent [19]
Hinkelmann et al.

[11] Patent Number: 5,328,023
[45] Date of Patent: Jul. 12, 1994

[54] CONVEYOR BELT FOR PIPE CONVEYOR

[75] Inventors: Rainer Hinkelmann; Ulrike Sander; Helmut Begemann, all of Hamburg, Fed. Rep. of Germany

[73] Assignee: Conrad Scholtz GmbH, Hamburg, Fed. Rep. of Germany

[21] Appl. No.: 37,039

[22] Filed: Mar. 25, 1993

[30] Foreign Application Priority Data

Apr. 16, 1992 [DE] Fed. Rep. of Germany ....... 4212824

[51] Int. Cl.$^5$ .............................................. B65G 15/34
[52] U.S. Cl. ..................................... 198/847; 198/819
[58] Field of Search ............... 198/818, 819, 821, 823, 198/847

[56] References Cited

U.S. PATENT DOCUMENTS

| | | | |
|---|---|---|---|
| 3,630,340 | 12/1971 | Bouzat et al. | 198/847 |
| 4,005,610 | 2/1977 | Simonsen et al. | 198/847 |
| 4,819,791 | 4/1989 | Melander | 198/818 |

FOREIGN PATENT DOCUMENTS

| | | | |
|---|---|---|---|
| 0231891 | 2/1964 | Austria | 198/847 |
| 0050962 | 5/1982 | European Pat. Off. | |
| 1934342 | 7/1970 | Fed. Rep. of Germany | 198/819 |
| 2209752 | 9/1973 | Fed. Rep. of Germany | 198/847 |
| 3910911 | 10/1989 | Fed. Rep. of Germany | |
| 4113626 | 10/1992 | Fed. Rep. of Germany | 198/847 |
| 1285945 | 12/1962 | France | 198/847 |
| 2195309 | 4/1988 | United Kingdom | |
| 9003930 | 4/1990 | World Int. Prop. O. | 198/847 |

OTHER PUBLICATIONS

Lachmann, H. P.: Zum Stand der Fordergurtenwicklung (1), dhf (Deutsche Hebe-und Fordertechnik) Jan. 1977-(19), Jg. 23, pp. 33–37.

Spinka, H.: Korrosionsfestigkeit von Fordergurten, Gluckauf 118 (1982) Nr. 22. pp. 1131–1134.

"The Wire Rope Conveyor Belt of the 3-Metre Belt Installations in Conjunction with the Drive Station"; Dr. Ing. M. Hager; pp. 22–28; Jan./Feb. 1977; Braunkohle.

"Modernes Hochofenvorfeld mit Sinteranlage"; B. Schett & K. Hedemann; pp. 3–7; Aug. 1972; Zeitschrift für Aufbereitung und Verfahrenstechnik, Heft 8, Clouth Gummiwerke AG.

Primary Examiner—James R. Bidwell
Attorney, Agent, or Firm—Bell, Seltzer, Park & Gibson

[57] ABSTRACT

A conveyor belt for pipe conveyors is indicated which includes overlapping of the conveyor belt at the edges when the belt pipe is formed and which consists of rubber or rubber-like plastic material and a plurality of steel ropes, all being alike, embedded therein as tension carriers and extending in longitudinal direction of the conveyor belt. They all have the same mutual spacing in transverse direction of the conveyor belt and are especially rich in elongation. At the runing side of the conveyor belt a continuous, transversely stiff insert is provided in addition, it extends across the full width of the conveyor belt and comprises steel cords oriented in transverse direction. Another transversely stiff, textile insert is provided in addition at the supporting side of the conveyor belt, yet it is not located in the two edge regions of the conveyor belt which overlap when the belt pipe is formed.

9 Claims, 1 Drawing Sheet

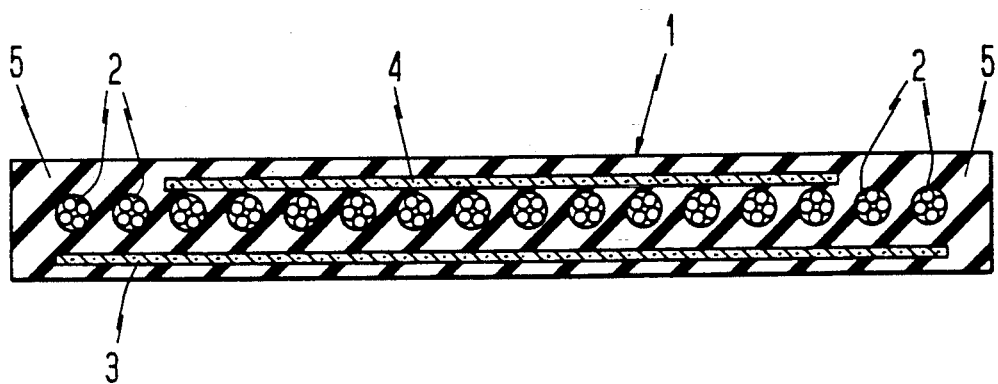

CONVEYOR BELT FOR PIPE CONVEYOR

SUMMARY OF THE INVENTION

The invention relates to a conveyor belt for pipe conveyors with overlapping of the conveyor belt at the edges when the belt pipe is formed, consisting of rubber or rubber-like plastic material and a plurality of steel ropes embedded therein as tension carriers and extending in longitudinal direction of the conveyor belt, the steel ropes being disposed equally spaced from one another across the width of the conveyor belt.

BACKGROUND OF THE INVENTION

With tubular belt conveyors, also referred to as hose-type belt conveyors or pipe conveyors, mechanical means are used to form the conveyor belt into a closed tube or pipe in the conveying zone proper, downstream of the loading area and up-stream of the discharge area. In the case of the more recent structures the closing of the "pipe" is accomplished by overlapping of the conveyor belt alongs both its edges. To permit the formation of the tubular belt, the conveyor belt structure must conform to high requirements not comparable with those of a normal conveyor belt. While requirements, such as good trough formation, high tensile strength, corrosion protection of the steel reinforcement, and resistance of the belt running and supporting sides are in the foreground with normal conveyor belts, it is additionally important with tubular belt conveyors to achieve the best possible formation of a circle with a tight overlap that does not protrude. To accomplish that, the external marginal zone of the conveyor belt must not tip outwardly and the internal marginal zone must not tip inwardly too much. Moreover, in spite of the pipe formation, the conveyor belt must remain well deflectable both in the vertical and horizontal planes, in other words in curves. This means that it must remain stable in shape and true to track no matter what the bending. Finally, no twisting should occur in the conveyor belt formed into a pipe in the sense that the overlap usually located at the top would shift more or less to one or the other side.

Usually the structure including embedded steel ropes as tension barriers is preferred if a conveyor belt has to accommodate high tensile forces either because of the great length of the conveying distance or due to high loading. In this context the small elastic elongation of the steel cords generally is regarded as being of particular advantage.

A pipe conveyor of the generic kind in question with overlapping of the conveyor belt at the edges when the belt pipe is formed is known from DE-OS 39 10 911. It consists of rubber or rubber-like plastic and a plurality of steel cords as tension carriers embedded therein and extending in longitudinal direction of the conveyor belt, the tension carriers being disposed so as to be distributed uniformly across the width of the conveyor belt. The steel cords of this known conveyor belt either have a smaller diameter in the region of overlap ("A") than in the remainder of the belt ("B"), or the steel cords have a different strength at those locations. This different design treatment of the conveyor belt structure is intended to meet at least some of the requirements explained above of a tubular conveyor belt. It was found, however, that this is possible only to a limited extent by means of that particular known structure, especially so as regards the curve negotiating characteristic of the conveyor belt with smaller radii of curvature and as regards the length of the trough formation. Furthermore, many times it is more expensive to produce a steel cord conveyor belt with different steel cords or with steel cords which are arranged so as to be distributed differently.

OBJECT AND SUMMARY OF THE INVENTION

It is the object of the instant invention to provide a steel cord conveyor belt with edges overlapping in tubular fashion which is simple to produce, subject to minimum twisting, and characterized by good curve negotiating when the conveyor belt is circular and tight.

This object is met, according to the invention, with a conveyor belt for pipe conveyors of the kind mentioned initially in that the steel cords or ropes are all alike and dispose of high elastic elongation. A tubular conveyor belt is achieved which is flexible, deflectable towards all sides, and yet of stable inherent shape due to the ropes which are rich in high elongation.

The advantages of the tubular conveyor belt especially reside in the good curve negotiating characteristic which the belt, being of simple structure with exclusively the same steel ropes, possesses due to the use of special steel ropes or cords and in the fact that it fulfills the special requirements of a tubular conveyor belt. Due to curve guidance of the conveyor belt, the cords disposed at the inside of the curve become relieved and the opposite cords are extended. When the curve is concave, the zone of overlap lies at the inside of the curve, whereby consequently relief occurs for the cords in the edges of the belt. This is where the use according to the invention of ropes which are rich in elongation makes sure that sufficient elongation of the ropes in the belt edges is achieved even at small loading to warrant a tightly sealed overlap and thus a clean pipe formation. On the whole, all the components of the tubular conveyor belt according to the invention cooperate in optimum fashion so that the best conditions are given for a conveyor belt assembly having excellent operational efficiency and a long service life.

Thus it is preferably provided for the elongation values of the steel ropes that they have an elongation of more than 0.3% measured at from 2 to 20% of their nominal strength, especially preferred being even an elongation of more than 0.35%, likewise measured at from 2 to 20% of their nominal strength. The elongation values named for the steel ropes refer to a measuring method related to ISO standard 9856: There it is suggested to cut a full thickness specimen in longitudinal direction out of the conveyor belt to be examined and to subject it to sinusoidal tensile stress between 2% and 10% of the nominal strength of the belt. The tension in those tests was raised to a value between 2% and 20% of the nominal strength of the steel rope for the purposes of the instant invention. The elongation then is the quotient of the difference in lengths which the steel rope has when loaded at 2% of its nominal strength, on the one hand, and when loaded at 20% of its nominal strength, on the other hand, and the length of the steel ropes without any load.

For greater tube diameters the inherent stability and the resistance of the belt must be improved by a special arrangement of transversely stiff inserts. To that end it is provided especially advantageously that one or more inserts are arranged at the supporting side or at the running side or at both sides of the conveyor belt, which inserts are not located in the two edge regions of the conveyor belt. It is the object of this transverse reinforcement to apply a restoring force which, on the one hand, supports the opening of the belt and, on the other hand, the pipe configuration. Due to the restoring force which the conveyor belt receives from the transversely stiff inserts, the conveyor belt has the tendency to open in the discharge area. Also the opening for further intermediate admission of material to be conveyed is supported thereby. Moreover, this restoring force counteracts the forces acting upon the belt when guided through a curve, thus maintaining the tubular configuration, as desired.

It may be provided advantageously, as an alternative to the preceding further development, that one or more inserts are disposed at the supporting side which are not located in the two edge regions of the conveyor belt and/or that one or more inserts are disposed at the running side which extend substantially across the full belt width. The expression "transversely stiff" in the present context means greater stiffness in transverse direction than in longitudinal direction, and the statement "substantially across the full belt width" means that the edge protection of the conveyor belt, i.e. the two outermost lateral margins are not included so that no corrosion worth mentioning and no wear worth mentioning will result.

Preferably, the continuous, transversely stiff insert at the running side is a fabric which comprises steel cords in weft direction and textile filaments or cords in warp direction. These textile filaments or cords may be made, for example, of poylamide and they essentially serve to hold the steel cords together.

To form the insert which is possible at the supporting side, it is preferably provided that this insert is a fabric of synthetic filaments or synthetic cord in the warp and in the weft.

BRIEF DESCRIPTION OF THE DRAWING

The only figure shows a preferred embodiment of a conveyor belt for pipe conveyors in cross section.

DETAILED DESCRIPTION OF PREFERRED EMBODIMENT OF THE INVENTION

The conveyor belt 1 illustrated is made of rubber and has a tension carrier consisting of a plurality of steel ropes 2 which extend in longitudinal direction of the conveyor belt and are embedded in the rubber body of the conveyor belt. The steel ropes are all alike, i.e. they all have the same physical properties, they all have the same diameter, and, being disposed in one plane, they are arranged at the same mutual spacing in transverse direction of the conveyor belt, i.e. uniformly distributed across the width of the conveyor belt. They are special ropes, otherwise not used for steel cord conveyor belts, having a comparatively high elongation of more than 0.3%, measured at from 2 to 20% of their nominal strength according to ISO standard 9856.

A continuous, transversely stiff insert 3 is embedded in the conveyor belt 1 below the steel cords 2, at the running side 7 of the conveyor belt 1, i.e. at the outside when the pipe is formed. "Continuous" here means that this insert or transverse reinforcement extends substantially throughout the whole width of the conveyor belt, however, with the edge protection of the conveyor belt being left out so that no corrosion worth mentioning or no wear worth mentioning will result. The continuous, transversely stiff insert 3 is a fabric comprising steel cords which are relatively resistant to flexing in weft direction, i.e. in transverse direction of the conveyor belt, and textile cords of polyamide in warp direction, i.e. in the longitudinal direction of the conveyor belt. The polyamide cords substantially serve only for the cohesion of the fabric.

The conveyor belt 1 further comprises another textile insert 4, at the supporting side 6 above the steel ropes 2, which is provided only in the central area of the conveyor belt and is not located in the edge regions 5 either which overlap each other when the belt pipe is formed with the conveyor belt in operation. The textile insert or transverse reinforcement likewise is a fabric made, however, of synthetic filaments or synthetic cords both in its warp and weft. Exemplary material here is polyester. Just like the insert 3 at the running side, the insert 4 at the supporting side does not contribute to the tensile strength of the conveyor belt. Instead, essentially it produces only transverse stiffness, and it does so also in cooperation with the insert 3 at the running side due to the spacing between the two inserts in the direction of the height of the conveyor belt.

What is claimed is:

1. A conveyor belt constructed of a material having rubber-like characteristics and defining longitudinally-extending side edge regions and a running side and a supporting side and being constructed for use as a pipe conveyor wherein said side edge regions are disposed in overlapping position, said belt further including a plurality of steel ropes embedded therein as tension barriers, said ropes being of like construction and having a high elongation of more than 0.3% measured at from 2 to 20% of their nominal strength, and said ropes being disposed in equally spaced-apart positions in said belt across the full width of said belt.

2. A conveyor belt, as set forth in claim 1, in which said plurality of steel ropes have a high elongation of more than 0.35% measured from 2 to 20% of their nominal strength.

3. A conveyor belt, as set forth in claim 1, further including at least one insert imbedded in said belt on said supporting side and not extending into said side edge regions.

4. A conveyor belt, as set forth in claim 1, in which said belt further includes at least one insert imbedded in said belt on said running side and extending across the entire belt width and into said side edge regions.

5. A conveyor belt, as set forth in claim 1, in which said conveyor belt further includes at least one insert imbedded in said belt on said supporting side and not extending into said side edge regions, and at least one insert embedded in said belt on said running side and extending substantially across the entire width of the belt and into said side edge regions.

6. A conveyor belt, as set forth in claim 3, in which said at least one insert embedded in said belt on said supporting side comprises a fabric made of synthetic yarn forming both the warp and the weft.

7. A conveyor belt, as set forth in claim 5, in which said at least one insert embedded in said belt on said supporting side comprises a fabric made of synthetic yarn forming both the warp and the weft.

8. A conveyor belt, as set forth in claim 4, in which said at least one insert embedded in said belt on said running side comprises a fabric including steel cords in the weft direction and textile cords in the warp direction.

9. A conveyor belt, as set forth in claim 5, in which said at least one insert embedded in said belt on said running side comprises a fabric including steel cords in the weft direction and textile cords in the warp direction.

* * * * *